March 1, 1960 O. V. GREUNKE 2,926,730

COMBINED ELECTRONIC DATA STORAGE AND CONTROL SYSTEM

Filed July 27, 1955 3 Sheets-Sheet 1

INVENTOR
O. V. GREUNKE

BY Louis Etlinger
ATTORNEY

March 1, 1960 O. V. GREUNKE 2,926,730
COMBINED ELECTRONIC DATA STORAGE AND CONTROL SYSTEM
Filed July 27, 1955 3 Sheets-Sheet 2

INVENTOR
O. V. GREUNKE
BY
[signature]
ATTORNEY

March 1, 1960 O. V. GREUNKE 2,926,730

COMBINED ELECTRONIC DATA STORAGE AND CONTROL SYSTEM

Filed July 27, 1955 3 Sheets-Sheet 3

FIG. 4.

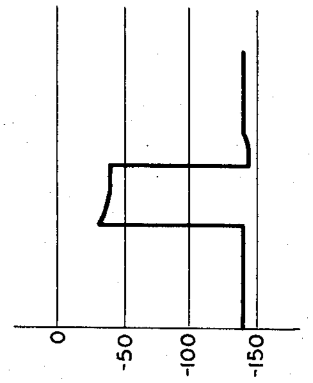

LINE 1-STORAGE INPUT (FROM OUTPUT DECODER) IN ORDER TO FIRE 'BIT' LINE 1 MUST BE HIGH AT TIME OF STORAGE SET PULSE

FIG. 5.

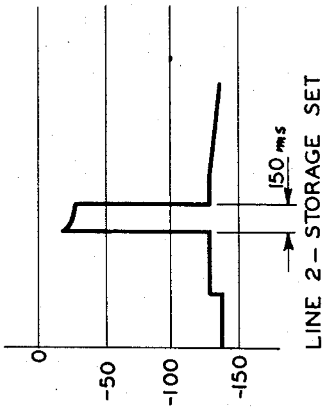

LINE 2- STORAGE SET HIGH DURING SET

FIG. 6.

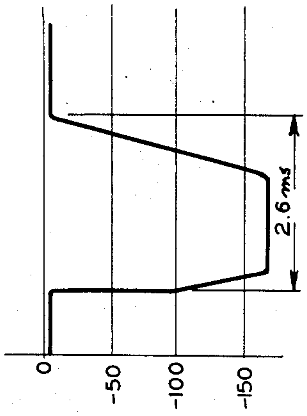

LINE 3- STORAGE HOLD & CLEAR LOW DURING CLEAR

FIG. 7.

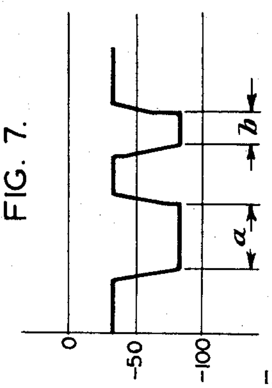

LINE 4 - STORAGE CALL (READ-OUT INTO ACCUMULATOR) LOW DURING a & b

FIG. 8.

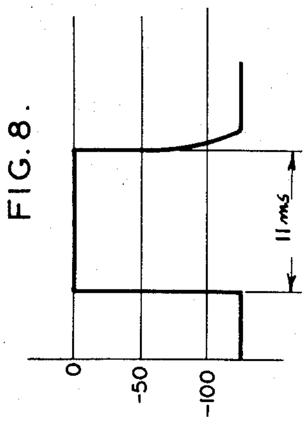

LINE 5 - ACTUATOR SET HIGH DURING SET

FIG. 9.

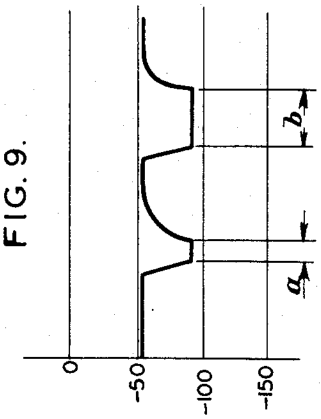

LINE 6 - STORAGE OUTPUT (TO ACCUMULATOR INPUT TRANSLATOR) LOW AFTER STORAGE SET DURING INTERVALS a & b

INVENTOR
O. V. GREUNKE

BY [signature]
ATTORNEY

United States Patent Office
2,926,730
Patented Mar. 1, 1960

2,926,730

COMBINED ELECTRONIC DATA STORAGE AND CONTROL SYSTEM

Orville V. Greunke, Westport, Conn., assignor to Sperry Rand Corporation, New York, N.Y., a corporation of Delaware Application July 27, 1955, Serial No. 524,737
16 Claims. (Cl. 164—111)

This invention relates to electronic data storage systems for computers, high speed printers and the like and is directed particularly to a result storage system made up of circuits in which a single tube with its associated circuitry carries out both the storage function and control function.

In electronic digital computers, electronic printers, electrical sorting equipment and the like, handling information in the form of electric pulses, it is necessary to store data representing the result of calculations, or operations, for the purpose of checking the result and/or for use in subsequent operations before or after the information is used to actuate permanent recording equipment, such as card punches, printing actuators and the like. Card punching actuators, for example, normally require current in excess of that capable of being supplied by storage components and usually have a separate set of power tubes to actuate the punching actuators. Where relays are used for storage and actuating card punches, the system is limited to a relatively slow speed of operation and to a low overall efficiency because of the large amount of power required to operate the relays.

The advantage of the applicant's system is that a single tube, with its associated circuitry, performs both the functions of storing bits of information and supplying enough power to control the actuating devices of a card punch or printer without losing the stored information. The arrangement of this invention, whereby a cold cathode gas tube is used for both storage of information and to actuate relays, results in a system which operates at a speed several times greater than that possible with a relay system, at high efficiencies and more reliably than separate storage and control systems.

The use of cold cathode tubes, which do not require any filament power for their operation, constitutes a very marked increase in the overall efficiency of a computer system in view of the large number of tubes usually required for storage and actuating relays.

Other advantages of the invention will be evident from the following description and claims, and illustrated in the accompanying drawings which describe by way of example the principle of the invention by the replacement of the relay type result storage with the invention in a computing system, as exemplified in pending U.S. Serial No. 330,961, filed January 13, 1953, by Loring P. Crosman.

In the drawings:

Figs. 4 to 9 are diagrams of the voltage wave forms that appear on the various lines of the circuit shown in Fig. 2.

The system described is shown with 12 result storage units, each capable of storing 10 digit numbers plus a representation to indicate whether the number is positive or negative, but the invention may be used with a system having N result storage units handling any number of storage "bits." The function of the result storage unit is to hold information from the accumulator and feed the information either to the card punching equipment or to the accumulator, or both by way of the input buffer for checking the result or for use in subsequent computations.

Figure 3:
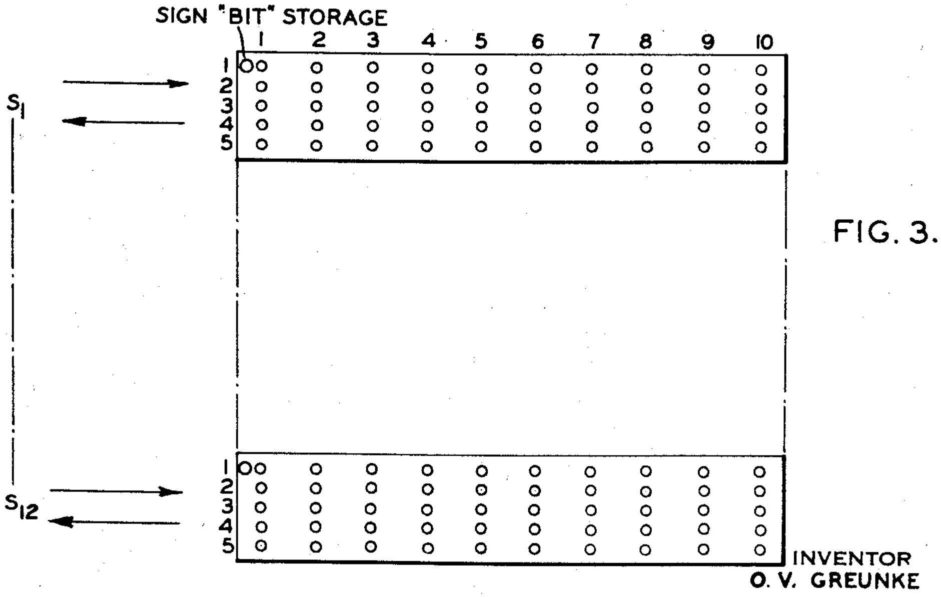
Fig. 3 is a diagram showing the arrangement of the result storage unit where each circle represents a separate memory and control circuit.

The result storage handles information in the form of "bits." In the embodiment shown, a 90 column code requiring five memory "bits" to properly identify a number is used. Each 10 digit storage consists of 50 storage "bit" circuits, of which the one shown in Fig. 3 is exemplary, plus that one sign storage "bit" for each 10 digit number.

Although the invention will be described utilizing a type 5823 cold cathode glow-discharge triode, the invention is not limited to this type of tube and can be carried out as well with other type tubes, such as thyratrons, trigger tubes, etc. Similarly, the circuit values and voltage levels, shown in Fig. 2, are given by way of example only and are not intended to limit the scope of the invention.

Figure 1:
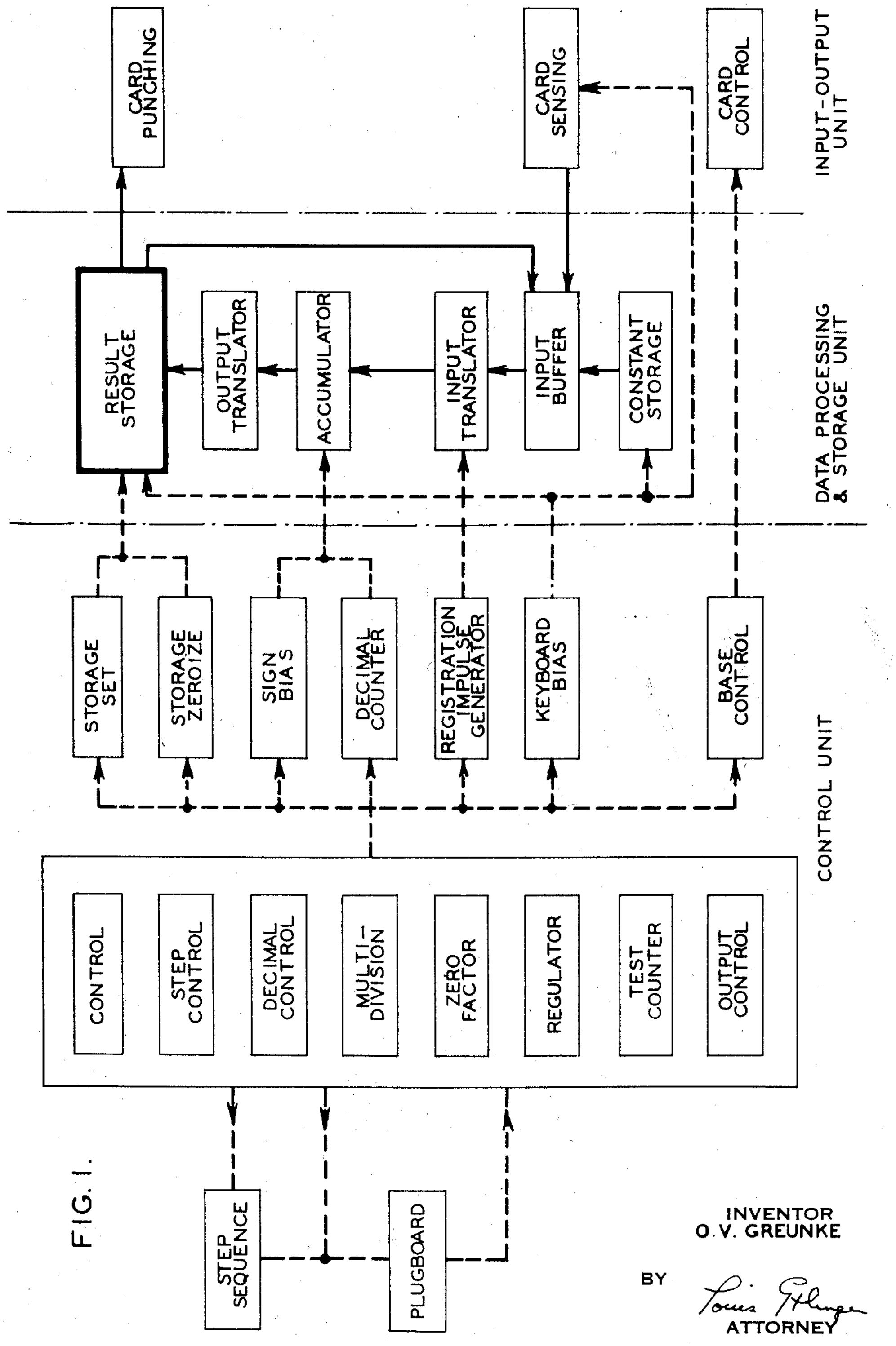
Fig. 1 is a block diagram of a complete computer showing the location in the computing system of an embodiment of the invention.
Figure 2:
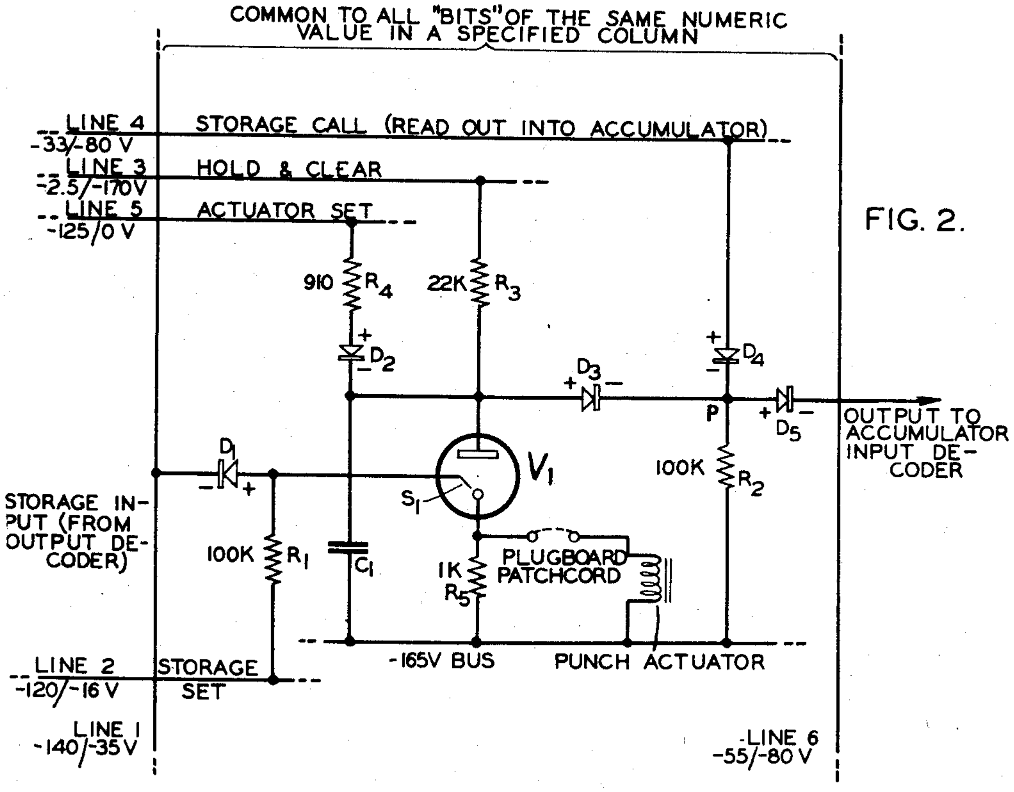
Fig. 2 is a circuit diagram of one memory bit and control circuit used in the result storage and control system as applied to the computer of Fig. 1.

Referring to Fig. 2, each storage "bit" circuit includes a 5823 tube $V_1$ which is controlled by signals or voltage levels applied to lines 1 to 5 inclusive.

Considering the elements associated with each line: Line 1 is the storage input line, which feeds information from the output translator and is connected to the starter electrode $S_1$ of tube $V_1$ through a unidirectional impedance $D_1$. Line 1 is common to all "bits" of the same numeric value in a specified column of all 12 result storage units.

Line 2 is the storage set line and is connected to the starter electrode $S_1$ of tube $V_1$ through a resistor $R_1$. The side of resistor $R_1$ connected to the starter electrode $S_1$ is also connected to the anode side of the unidirectional impedance element $D_1$.

Line 3 is the hold and clear line which is connected to the anode of tube $V_1$ through resistor $R_3$, supplying anode voltage to the tube and controlling the clearing of the tube's information when it is no longer required to be held.

Line 4 is the storage call line which controls the circuit to read out the "bit" into the accumulator and is connected to the anode of tube $V_1$ through the unilateral impedances $D_4$ and $D_3$. The junction of the cathodes of $D_4$ and $D_3$ (point P) is connected to a negative D.C. source through a resistor $R_2$ and to the output through the unilateral impedance $D_5$, which is fed to the accumulator input decoder. The elements $D_3$, $D_4$, $D_5$ and $R_2$ connected together at point P cooperate to operate as a diode gate.

Line 5 is the actuator set line which controls the tube $V_1$ to set the punch actuators of the card punching equipment and is connected to the anode of $V_1$ through the resistor $R_4$ in series with the unilateral impedance $D_2$. The punch actuator coil is connected to the cathode of the tube $V_1$ through the plugboard patch cards and is in parallel with the resistor $R_5$. The other side of the punch actuator coil and the resistor $R_5$ is connected to a negative D.C. supply source. Although not shown, the punch actuator coil can be placed in the plate circuit in series with $D_2$, $R_3$ and $D_3$.

Line 6 is the output line of the storage "bit" circuit which goes to the accumulator input translator through the input buffer. All the outputs of the storage "bit"

circuit are common to all "bits" of the same numeric value in a specified column.

The capacitor $C_1$ is connected from the anode of tube $V_1$ to the negative D.C. source to prevent the anode voltage from firing the tube at undesired times.

The operation of the electronic data storage and control system will now be described in terms of the function of the various control lines and in connection with the voltage wave forms shown in Figs. 4 through 9.

The ability of the tube $V_1$ to store information in the form of a "bit" is based on its characteristic whereby the tube can assume one or the other of two stable states. The tube is non-conducting until the starter electrode to cathode voltage is made to exceed the tube's breakdown level. When the anode to cathode voltages and the starter electrode voltage are at a proper level the gas in the tube ionizes and the tube "fires." It remains in a conductive stage until the anode current is interrupted for an interval of time sufficient for the gas to deionize. In the case of the 5823 cold cathode glow-discharge triode, the average starter to cathode voltage necessary for ionization of the tube is approximately 80 volts; the average anode cathode voltage after ionization is approximately 60 volts. The time allowed in the system for "firing" of the tube is approximately 150 microseconds.

To clear or deionize the tube, the anode voltage of the tube is reduced for total time interval of approximately 2.6 milliseconds.

*Storage input line—Line 1*

Before an information "bit" can be stored in the system in any particular storage "bit" circuit, the voltage on line 1 going into that circuit from the output translator must be raised to a high level. This function is carried on by a pulse which raises the steady state voltage on line 1 of approximately minus 140 volts to minus 35 volts. The voltage appearing on line 1 thus selects the "bits" on each column of 12. See the voltage wave form, Fig. 4.

*The storage set line—Line 2*

To set an information "bit" in any circuit the voltage of line 2 is raised from its steady state value of approximately minus 130 volts to minus 16 volts, thereby raising the starter electrode voltage level of tube $V_1$ and thus "firing" the tube. The unilateral impedance $D_1$ clamps the upper voltage level of the storage set pulse that appears at the starter electrode of $V_1$. If the voltage level on line 1 is low, the set pulse cannot raise the starter electrode $S_1$ of tube $V_1$ to a level sufficient to fire the tube. For example, with the values given above, the voltage appearing between the starter electrode and cathode would be approximately 60 volts for this condition when approximately 80 volts are required to fire the tube. However, when the voltage level on line 1 is high the set pulse can raise the starter electrode and the cathode high enough to fire the tube. The storage set pulse is shown in Fig. 5.

*The hold or clear line—Line 3*

This line controls the voltage level of the anode of tube $V_1$ and is the anode current supply source of the tube. The voltage level of line 3 is held near ground potential during the information hold condition. The value of the resistor $R_3$ has been selected to limit the tube current to that value required for reliable tube operation during the storage function, but not high enough to operate the punch actuators in the cathode circuit of $V_1$. In order to clear the "bit" stored in tube $V_1$ the voltage on line 3, applied to the anode of the tube $V_1$, is lowered to a level below the cathode voltage.

In the embodiment shown herein the voltage is lowered for a 2.6 millisecond period to approximately minus 170 volts, which is low enough and of sufficient duration to deionize the tube. See Fig. 6. Since the voltage on line 3 is rapidly restored to a voltage near cathode level after the clear pulse, this rapid raising of the anode voltage would fire the tube at an undesired time. The capacitor $C_1$ connected in the tube circuit between the anode of $V_1$ and the negative D.C. supply prevents the voltage being applied too rapidly to the tube anode.

*Storage call line—Line 4*

This line controls the reading out of the stored "bit" to the accumulator through the input translator for checking the result or storing the information for subsequent operations. When the "bit" is to be read out into the accumulator the voltage on line 4 is lowered to approximately minus 80 volts by a pulse which is shown in Fig. 7. If tube $V_1$ is not conducting during the interval when the voltage on line 4 is lowered, the anode voltage of $V_1$ is high and the voltage level of point P is held high by the unilateral impedance $D_3$. Further, if tube $V_1$ is conducting but line 4 is high, the anode voltage of tube $V_1$ is low and the voltage level at P is still held at a high level by the unilateral impedance $D_4$ cooperating with the voltage on line 4.

To feed the "bit" to the accumulator, both the tube $V_1$ must be in a conductive state and the voltage on line 4 must be lowered. At this time the voltage at point P will drop and clamp the voltage level on line 6 low through the unilateral impedance $D_5$ thereby indicating the "bit" condition to the input circuit of the accumulator. The wave forms for line 4, Fig. 7, show the voltage appearing during intervals, (*a*) the read-in interval and (*b*) the read-in interval for proving or checking purposes.

*Actuator set line—Line 5*

This line controls the punch actuator relays of the card punching equipment. To actuate the relay, the voltage on line 5 is raised from its steady state value of approximately minus 125 volts to a level of zero volts by a pulse, whose period of duration is approximately 11 milliseconds. As seen from Fig. 2, the value of resistor $R_4$ is much lower than $R_3$ and is selected to permit sufficient current to flow through tube $V_1$ to set the punch actuator relay in the cathode circuit. The raising of the voltage level on line 5 permits the unilateral impedance $D_2$ to conduct, thereby presenting the tube $V_1$ with a lower output impedance and allowing sufficient current to flow to set the punch actuator.

The reading out of the signal stored in the tube through the punch actuator does not result in the loss of the signal stored in the tube $V_1$. Upon the restoration of the negative steady state voltage on line 5, the tube $V_1$ is still in a conductive state. Self-latching punching actuators are used which can be set by a short duration high current pulse. The voltage wave form for line 5 is shown in Fig. 8.

*Output line—Line 6*

The function of this line is to tie the outputs together of all "bits" of the same numeric value in a specified column and to feed these outputs to the input buffer and input translator.

When a "bit" is sent to the accumulator the voltage level on line 6 is lowered from its steady state value of approximately minus 55 volts to approximately minus 80 volts. In the wave forms for line 6, Fig. 9, interval (*a*) is the read-in interval to the accumulator input for use in subsequent operations and interval (*b*) is the read-in interval for proof or checking of results.

From the above description it is seen that the invention performs the dual function of storing information in the form of "bits" and also controls the punch card actuating equipment without the necessity of separate power units. The storage process is efficient since only the minimum power necessary to store the information is used. Yet the larger amount of power needed to actuate the output devices such as card punches, printing relays, and the like is available when required.

Although the invention has been described by way of example, as operating with an electronic computer, the invention may be utilized to advantage in other systems which store information and use that information to control output devices.

What is claimed is:

1. In a computer result storage system for handling information in the form of electrical signals and having card punching equipment as part of the system, a result storage system consisting of a plurality of circuits, each circuit performing the dual function of storing information and operating the card punching actuators while retaining said information comprising a storage tube having input and output circuits capable of assuming one or the other of two stable states, card punch actuator means connected in the external circuit of said tube, input signal means connected to said tube to selectively change the state of said tube, diode gate output means connected to the output of the tube to permit the selective non-destructive readout of information stored in said tube, and punch acuator control means for controlling said tube so that it draws sufficient current to operate said card punch actuators.

2. The combination of claim 1 wherein said tube is of the gas filled type.

3. The combination of claim 1 wherein said tube is of the cold cathode glow-discharge type.

4. An electronic data storage and control system comprising a plurality of circuits which perform the dual function of storing information in the form of electrical impulses and operating a punching actuator without losing the stored information, each comprising a gas tube capable of assuming one or the other of two stable states having an anode, a cathode and a starter electrode, a punch actuator coil connected in the cathode circuit of said tube, a first impedance connected to the anode of said tube, a second impedance connected to the anode of said tube, signal input means connected to said starter electrode, diode gate output means connected to said tube anode, signal input means for changing the state of said tube from one state to the other and signal input means for selectively making said second impedance conductive thereby causing sufficient current to flow in the cathode circuit of the tube to operate the punch actuator relay without causing said tube to change its state.

5. The combination of claim 4 whereby said second impedance comprises a resistor in series with a unilateral impedance.

6. The combination of claim 4 whereby said first impedance comprises a resistor.

7. The combination of claim 4 whereby said second impedance comprises a diode having its cathode side connected to the anode circuit of said tube.

8. The combination of claim 4 except that the punch actuator coil is connected in the plate circuit of the tube in series with the first plate impedance, the second plate impedance and the diode gate circuit.

9. A circuit for use in any system wherein information is handled in the form of electrical pulses, stored for use in checking and/or in subsequent operations and for operating indicating equipment in accordance with said information without the loss of said information by means of a single tube comprising a cold cathode glow discharge tube having an anode, a cathode and a control element, output indicator actuator means connected in the external circuit of said tube between the anode and cathode, a first control and plate supply circuit having a resistor connected to the anode of said tube, a second control circuit having a diode with its cathode element connected to the anode of said tube and a resistor connected to the anode element of said diode, a first input circuit having a diode with its anode connected to the control element of said tube, a second input circuit having a resistor connected to the control element of said tube and an output diode gate circuit connected to the anode of said tube and a third control means connected to said diode gate circuit.

10. The combination of claim 9 wherein a cathode resistor is connected to the cathode of said tube and a source of potential, and said output indicator actuator means is connected in parallel with said cathode resistor.

11. The combination of claim 10 wherein a capacitor is connected between the anode of said tube and said source of potential.

12. The combination of claim 9 wherein said output actuator means is connected to the anode of said tube in series with the first control and plate supply circuit, the second control circuit and the output diode gate circuit.

13. The combination of claim 9 wherein said indicator actuator control means is the control coil of a card punching relay.

14. The combination of claim 9 wherein said indicator actuator control means is the printing actuator of an electrically controlled printer.

15. The combination of claim 9 wherein one side of the cathode resistor is connected to the cathode of said tube and the other side to a point at ground potential.

16. A system for handling information in the form of electric signals comprising a tube, means connected to said tube to make said tube conductive to represent the presence of information, means connected to said tube to provide for the non-destructive readout of said information, punch actuator means connected to said tube, means connected to said tube to selectively operate said punch actuator means and still retain said information in said tube, means connected to said tube to maintain said tube in a conductive state until said tube is selectively made non-conductive and means connected to said tube to remove said information therefrom by placing said tube in a non-conductive state.

References Cited in the file of this patent

UNITED STATES PATENTS

| | | |
|---|---|---|
| 2,284,101 | Robins | May 26, 1942 |
| 2,373,165 | Cawein | Apr. 10, 1945 |
| 2,487,923 | Ferguson | Nov. 15, 1949 |
| 2,502,443 | Dunn | Apr. 4, 1950 |
| 2,512,860 | Henrich | June 27, 1950 |
| 2,513,525 | Shenk | July 4, 1950 |
| 2,582,480 | Dimond | Jan. 15, 1952 |
| 2,624,786 | Potter | Jan. 6, 1953 |
| 2,659,815 | Curtis | Nov. 17, 1953 |
| 2,662,983 | Gordon | Dec. 15, 1953 |
| 2,676,249 | Crosman | Apr. 20, 1954 |
| 2,708,267 | Weidenhammer | May 10, 1955 |
| 2,710,353 | Dammers | June 7, 1955 |
| 2,711,794 | Ghertman | June 28, 1955 |